United States Patent
Fell, Jr. et al.

(10) Patent No.: US 11,577,828 B2
(45) Date of Patent: Feb. 14, 2023

(54) POWER DISPLAY FOR COMPOUND AIRCRAFT USING SHARED ENGINE TORQUE

(71) Applicant: LOCKHEED MARTIN CORPORATION, Bethesda, MD (US)

(72) Inventors: William C. Fell, Jr., Stuart, FL (US); Jason E. Browning, Ithaca, NY (US); Stacey Ann Sanchez, Port St. Lucie, FL (US); Kathryn P. Guy, Binghamton, NY (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 384 days.

(21) Appl. No.: 16/863,195

(22) Filed: Apr. 30, 2020

(65) Prior Publication Data

US 2021/0339851 A1     Nov. 4, 2021

(51) Int. Cl.
| | |
|---|---|
| *B64C 27/82* | (2006.01) |
| *B64C 27/10* | (2006.01) |
| *B64D 43/00* | (2006.01) |
| *B64C 27/26* | (2006.01) |
| *B64C 27/14* | (2006.01) |

(52) U.S. Cl.
CPC .............. *B64C 27/82* (2013.01); *B64C 27/10* (2013.01); *B64D 43/00* (2013.01); *B64C 27/14* (2013.01); *B64C 27/26* (2013.01); *B64C 2027/8236* (2013.01); *B64C 2027/8272* (2013.01); *B64C 2201/024* (2013.01); *B64C 2201/108* (2013.01)

(58) Field of Classification Search
CPC .......... B60K 37/00; G01D 7/02; G01D 7/002; G01D 2207/10
See application file for complete search history.

(56) References Cited

U.S. PATENT DOCUMENTS

| | | | |
|---|---|---|---|
| 4,514,142 A | 4/1985 | Young | |
| 5,050,081 A | 9/1991 | Abbott et al. | |
| 6,904,340 B2* | 6/2005 | Andre | G01D 3/024 701/14 |
| 7,031,812 B1 | 4/2006 | Pettigrew et al. | |
| 7,414,544 B2* | 8/2008 | Oltheten | B60K 37/02 701/14 |
| 7,870,059 B2* | 1/2011 | Shapiro | G06Q 40/00 705/37 |
| 8,463,465 B2 | 6/2013 | Piasecki et al. | |
| 9,272,778 B2 | 3/2016 | Eglin | |
| 9,355,571 B2 | 5/2016 | Rucci et al. | |
| 9,536,358 B2* | 1/2017 | Germanetti | B64D 43/00 |
| 10,145,708 B2* | 12/2018 | McCollough | G01C 23/00 |
| 10,173,787 B1* | 1/2019 | Oltheten | B64D 45/00 |
| 10,414,512 B2 | 9/2019 | Luszcz | |
| 10,457,417 B2* | 10/2019 | Oltheten | B64C 27/006 |
| 10,955,270 B2* | 3/2021 | Al-Ali | G01D 7/02 |

(Continued)

*Primary Examiner* — William Lu
(74) *Attorney, Agent, or Firm* — Michael Best & Friedrich LLP

(57) ABSTRACT

A power display of an aircraft having a main rotor system and a translational thrust includes a reference member, a first indicator arranged adjacent the reference member and operable to display a power being used by the main rotor system, and a second indicator arranged adjacent the reference member and operable to display a power being used by the translational thrust system.

20 Claims, 7 Drawing Sheets

(56) References Cited

U.S. PATENT DOCUMENTS

| | | | |
|---|---|---|---|
| 2003/0193411 A1* | 10/2003 | Price | G01C 23/005 |
| | | | 340/973 |
| 2006/0271526 A1* | 11/2006 | Charnock | G06Q 30/02 |
| 2009/0186320 A1* | 7/2009 | Rucci | G09B 9/08 |
| | | | 434/33 |
| 2016/0214733 A1* | 7/2016 | Vallart | B64C 27/57 |
| 2016/0260266 A1* | 9/2016 | Germanetti | B64D 43/00 |
| 2019/0113403 A1* | 4/2019 | Adams | B64C 27/08 |
| 2019/0389570 A1* | 12/2019 | Lauder | B64C 27/605 |
| 2021/0014613 A1* | 1/2021 | Carrigan | G06F 3/04847 |
| 2021/0263701 A1* | 8/2021 | Kotelly | G06F 3/0482 |

\* cited by examiner

POWER DISPLAY FOR COMPOUND AIRCRAFT USING SHARED ENGINE TORQUE

BACKGROUND

The present disclosure relates to a display system of a rotary wing aircraft, and more particularly, to systems and methods for enhanced graphical display of operational parameters of a rotary wing aircraft, with a variable pitch propulsor.

Computer generated aircraft displays have become highly sophisticated and are capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to personnel operating the aircraft.

Primary Flight Displays are computer-generated displays that provide flight crews with real-time visual representations of the operational states of their aircraft during flights. For example, the Primary Flight Display can combine critical flight instrumentation (e.g., altitude, attitude, heading, airspeed, vertical speed instruments) and primary engine instrument indicators into a single, readily interpretable display. As a result, Primary Flight Displays have become effective visual tools for controlling aircraft, reducing pilot workload, increasing situational awareness, and improving overall flight safety.

Conventional displays typically provide information related to engine torque and rotor torque as parameters related to aircraft performance. Because a translational thrust system is operable to vary aircraft airspeed, parameters associated with the translational thrust system must also be monitored. Accordingly, the engine torque, torque of the at least one main rotor, and the torque of the translational thrust system must be incorporated into the display. Inclusion of these parameters requires additional display indicators and additional display space allocation, resulting in increased pilot scan times when flying the aircraft.

BRIEF DESCRIPTION

According to an embodiment, a power display of an aircraft having a main rotor system and a translational thrust includes a reference member, a first indicator arranged adjacent the reference member and operable to display a power being used by the main rotor system, and a second indicator arranged adjacent the reference member and operable to display a power being used by the translational thrust system.

In addition to one or more of the features described above, or as an alternative, in further embodiments the first indicator and the second indicator are stacked relative to the reference member.

In addition to one or more of the features described above, or as an alternative, in further embodiments the first indicator and the second indicator cooperate to display a total power being used by the main rotor system and the translational thrust system in combination.

In addition to one or more of the features described above, or as an alternative, in further embodiments the first indicator is a first color and the second indicator is a second color different from the first color.

In addition to one or more of the features described above, or as an alternative, in further embodiments at least one of the first indicator includes a patterned fill when the main rotor system is approaching an operational limit and the second indicator includes a patterned fill when the translational thrust system is approaching an operational limit.

In addition to one or more of the features described above, or as an alternative, in further embodiments the first indicator includes the patterned fill when the main rotor system is approaching a main gearbox torque limit.

In addition to one or more of the features described above, or as an alternative, in further embodiments the second indicator includes the patterned fill when the translational thrust system is approaching a propeller gearbox torque limit.

In addition to one or more of the features described above, or as an alternative, in further embodiments comprising at least one limit marking formed along the reference member, wherein the at least one limit marking identifies one or more non-dimensional limits associated with operation of the aircraft.

In addition to one or more of the features described above, or as an alternative, in further embodiments the aircraft includes at least one engine and the at least one limit marking includes an engine limit marking, the engine limit marking representing a most limiting operational parameter associated with the at least one engine based on flight conditions of the aircraft.

In addition to one or more of the features described above, or as an alternative, in further embodiments the engine limit marking is fixed relative to the reference member.

In addition to one or more of the features described above, or as an alternative, in further embodiments the aircraft includes a propeller gearbox, and the at least one limit marking includes a propeller torque limit marking, the propeller torque limit marking representing a torque limit of the propeller gearbox.

In addition to one or more of the features described above, or as an alternative, in further embodiments the propeller torque limit marking is movable relative to the reference member.

In addition to one or more of the features described above, or as an alternative, in further embodiments comprising a symbol indicating a commanded power.

In addition to one or more of the features described above, or as an alternative, in further embodiments the symbol has a first configuration when the commanded power is achievable via control of at least one of the main rotor system and the translational thrust system, and the symbol has a second configuration when the commanded power exceeds an operational limit of the aircraft.

According to another embodiment, a method of using a power display of an aircraft includes displaying power being used by a main rotor system of the aircraft via a first indicator arranged adjacent a reference member and displaying power being used by a translational thrust system of the aircraft via a second indicator arranged adjacent the reference member.

In addition to one or more of the features described above, or as an alternative, in further embodiments comprising indicating a total power being used by the main rotor system and the translational thrust system in combination via the first indicator and the second indicator, the second indicator being stacked adjacent the first indicator relative to the reference member.

In addition to one or more of the features described above, or as an alternative, in further embodiments comprising indicating a non-dimensional engine limit.

In addition to one or more of the features described above, or as an alternative, in further embodiments comprising indicating a non-dimensional propeller gearbox torque limit.

In addition to one or more of the features described above, or as an alternative, in further embodiments comprising indicating a commanded power.

In addition to one or more of the features described above, or as an alternative, in further embodiments comprising indicating when the commanded power exceeds an operational limit of the aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
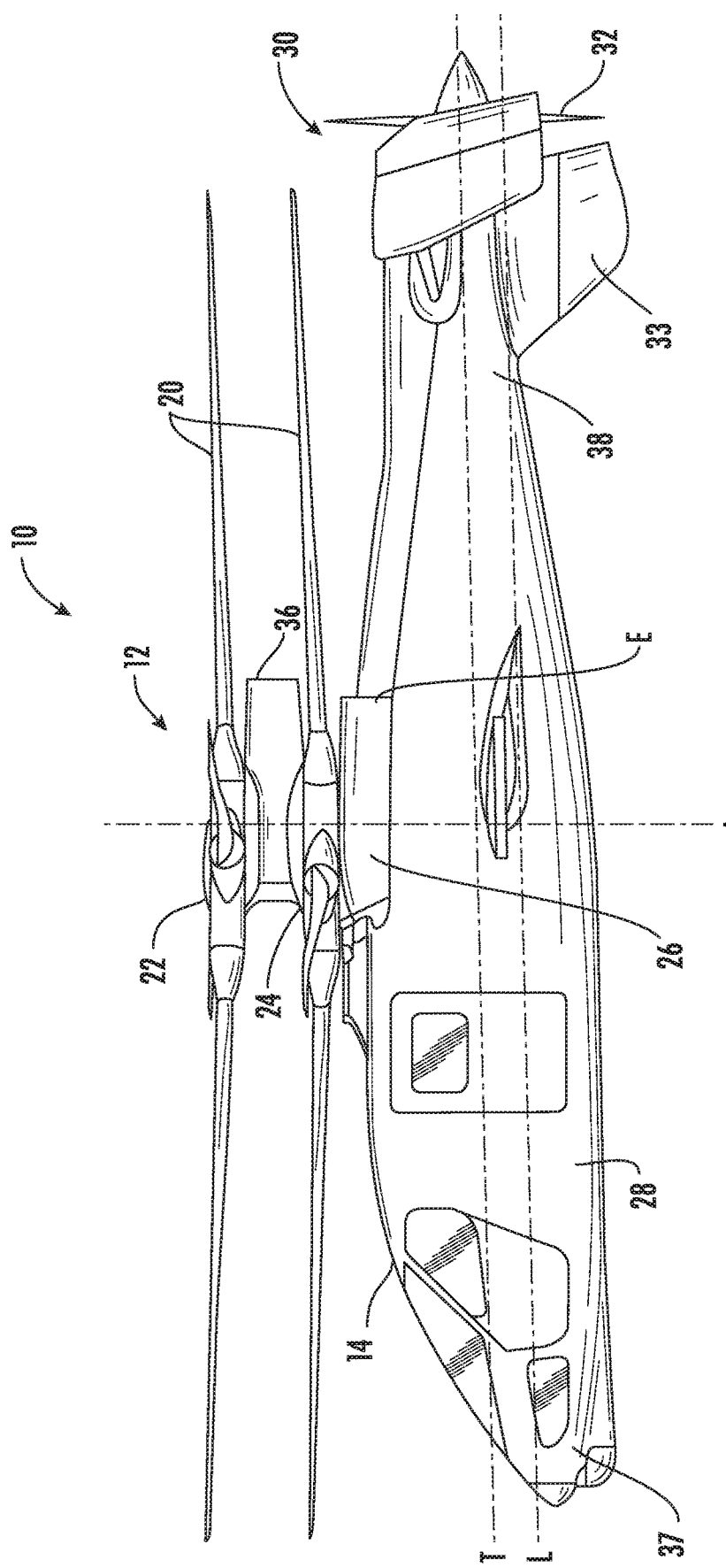
FIG. 1 is side view of an example of a rotary wing aircraft.

FIG. 1 illustrates an exemplary vertical takeoff and landing (VTOL) rotary-wing aircraft 10 having a dual, counter-rotating, coaxial main rotor system 12 which rotates about an axis of rotation A. The aircraft 10 includes an airframe 14 which supports the dual, counter rotating, coaxial main rotor system 12 as well as an optional translational thrust system 30 which provides translational thrust generally parallel to an aircraft longitudinal axis L. Although a particular aircraft configuration is illustrated in this non-limiting embodiment, other rotary-wing aircraft, such as a compound aircraft having a single main rotor for example, will also benefit from embodiments of the invention.

The dual, counter-rotating, coaxial main rotor system 12 includes an upper rotor system and a lower rotor system. Main rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of rotor blades 20 may be used with the main rotor system 12. The main rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may be located above the aircraft cabin 28 and drives the main rotor system 12. The translational thrust system 30 may be driven by the same main gearbox 26 which drives the main rotor system 12. The main gearbox 26 is driven by one or more engines (illustrated schematically at E).

The translational thrust system 30 may be mounted to the rear of the airframe 14 with a translational thrust axis, T, oriented substantially horizontal and parallel to the aircraft longitudinal axis L to provide thrust for high-speed flight In the illustrated, non-limiting embodiment, the translational thrust system 30 includes a pusher propeller 32 mounted at an aerodynamic tail fairing 33. The translational thrust axis T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized. For example, in an embodiment, a translational thrust system may be mounted at any location of the airframe, such as a to a wing for example.

Figure 2:
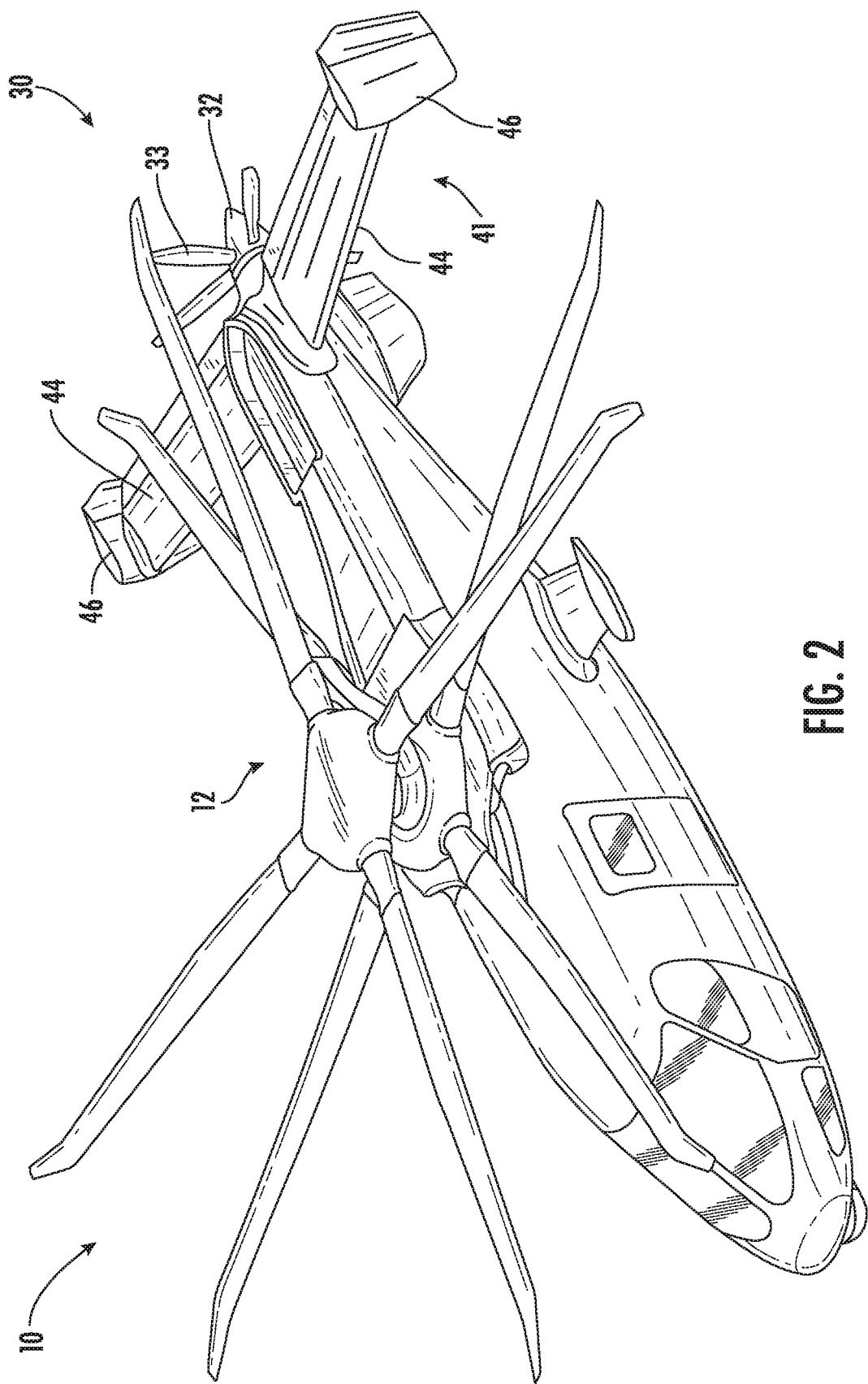
FIG. 2 is a perspective view of the rotary wing aircraft of FIG. 1.

In the example of FIGS. 1 and 2, the auxiliary propulsor 32 includes a plurality of propeller blades 34 and is positioned at a tail section 41 of the aircraft 10, The tail section 41 includes active elevators 44 and active rudders 46 as controllable surfaces, as best seen in FIG. 2. During flight regimes, aircraft pitch attitude and longitudinal velocity demands (i.e., speed) can change independently. Exemplary embodiments control both the main rotor system 12 and the translational thrust system 30 to support a range of aircraft pitch attitudes over a range of aircraft airspeeds.

Figure 3:
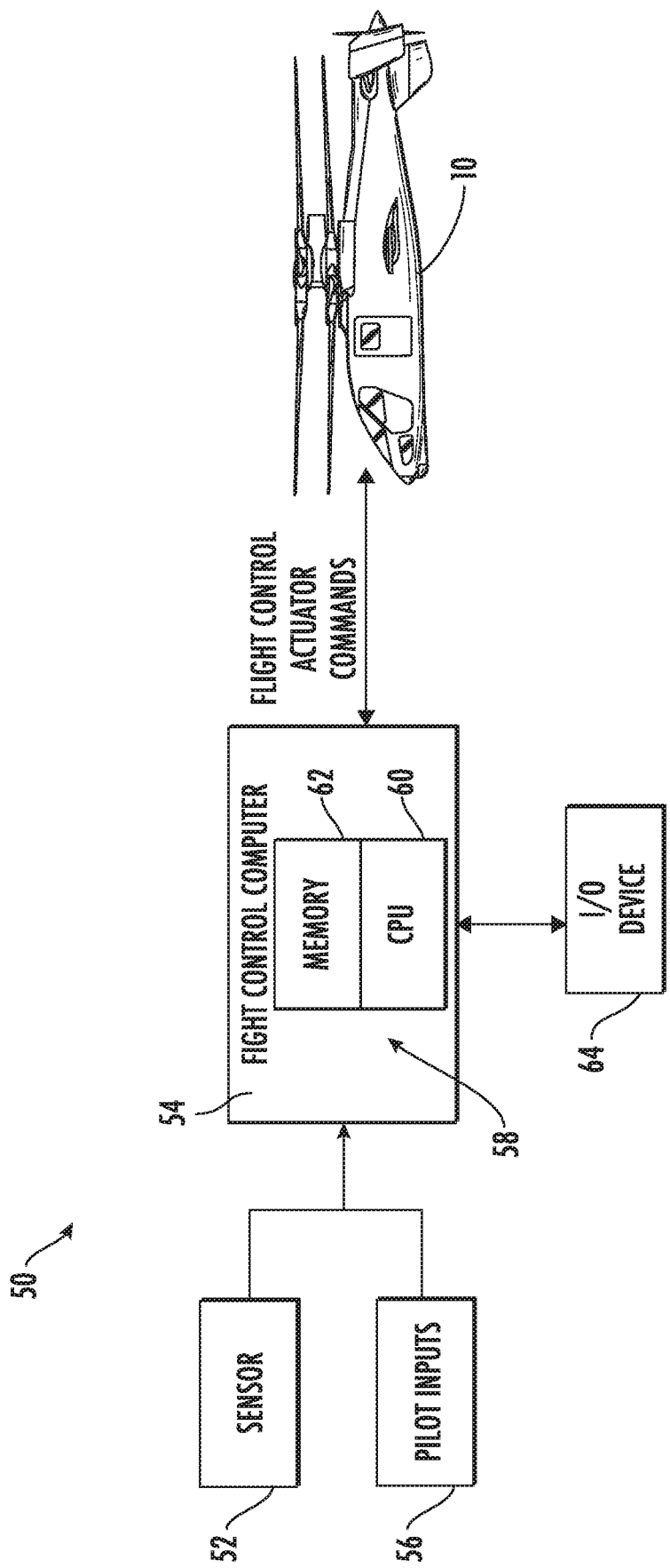
FIG. 3 is a schematic diagram of a control system of a rotary wing aircraft.

FIG. 3 illustrates an example of a control system 50 of an aircraft, such as aircraft 10. In one embodiment, the flight control system 50 is a fly-by-wire (FBW) control system. In a FBW control system, there is no direct mechanical coupling between a pilot's controls and movable components such as the main rotor blades 20 or propeller blades 34 of the aircraft 10 of FIG. 1. Instead of using mechanical linkages, a FBW control system 50 includes a plurality of sensors 52 which can sense the position of controlled elements and generate electrical signals proportional to the sensed position. The sensors 52 may also be used directly and indirectly to provide a variety of aircraft state data to a flight controller (FCC) 54. Examples of flight conditions of the aircraft measured by the sensors 52, include, but are not limited to, main rotor rotational speed, rotor torque, rotor blade pitch, propeller rotational speed, propeller torque, airspeed, and thrust for example.

Pilot commands or inputs 56 from pilot inceptors (not shown) are received by the FCC 54 as a commanded change to one or more components of the aircraft, such as the main rotor system or the translational thrust system for example. Pilot inputs 56 can be in the form of stick commands and/or beeper commands to set and incrementally adjust reference values for controllers. The pilot inputs 56 need not be directly provided by a human pilot, but may be driven by an automatic pilot, a remote control, a navigation-based control, or one or more control loops configured to produce one or more values used to pilot the aircraft 10. However, embodiments where the flight control system 50 is a mechanical flight control system and commands are implemented via direct mechanical linkages between pilot controls and control surfaces are also within the scope of the disclosure.

In response to inputs from the sensors 52 and pilot inputs 56, the FCC 54 transmits signals to various subsystems of the aircraft 10, such as the main rotor system 12 and the translational thrust system 30. In an embodiment, rather than simply passing pilot inputs 56 to various subsystems, a processing system 58 operably coupled to or integrated with the FCC 54 applies models and control laws to augment the flight control actuator commands provided to one or more servos or actuators of the aircraft 10.

The processing system 58 includes processing circuitry 60, memory 62, and an interface with at least one input/output device 64. The processing circuitry 60 can be any type or combination of computer processors, such as a microprocessor, microcontroller, digital signal processor, application specific integrated circuit, programmable logic device, and/or field programmable gate array, and is generally referred to as central processing unit (CPU). The memory 62 can include volatile and non-volatile memory, such as random access memory (RAM), read only memory (ROM), or other electronic, optical, magnetic, or any other computer readable storage medium onto which data and control logic as described herein are stored, Therefore, the memory 62 is a tangible storage medium where instructions executable by the processing circuitry 60 are embodied in a non-transitory form.

The I/O device 64 may be used to present information to, and/or receive input selections from, a user (e.g., a pilot). The at least one I/O device 64 may include a display device or screen, audio speakers, a graphical user interface (GUI), etc. It is to be appreciated that the control system 50 is intended as an example only illustrative. In some embodiments, additional components or entities not shown in FIG. 3 may be included. In some embodiments, one or more of the components or entities may be optional. In some embodiments, the components or entities of the control system 50 may be arranged or configured differently from what is shown in FIG. 3.

Figure 4:
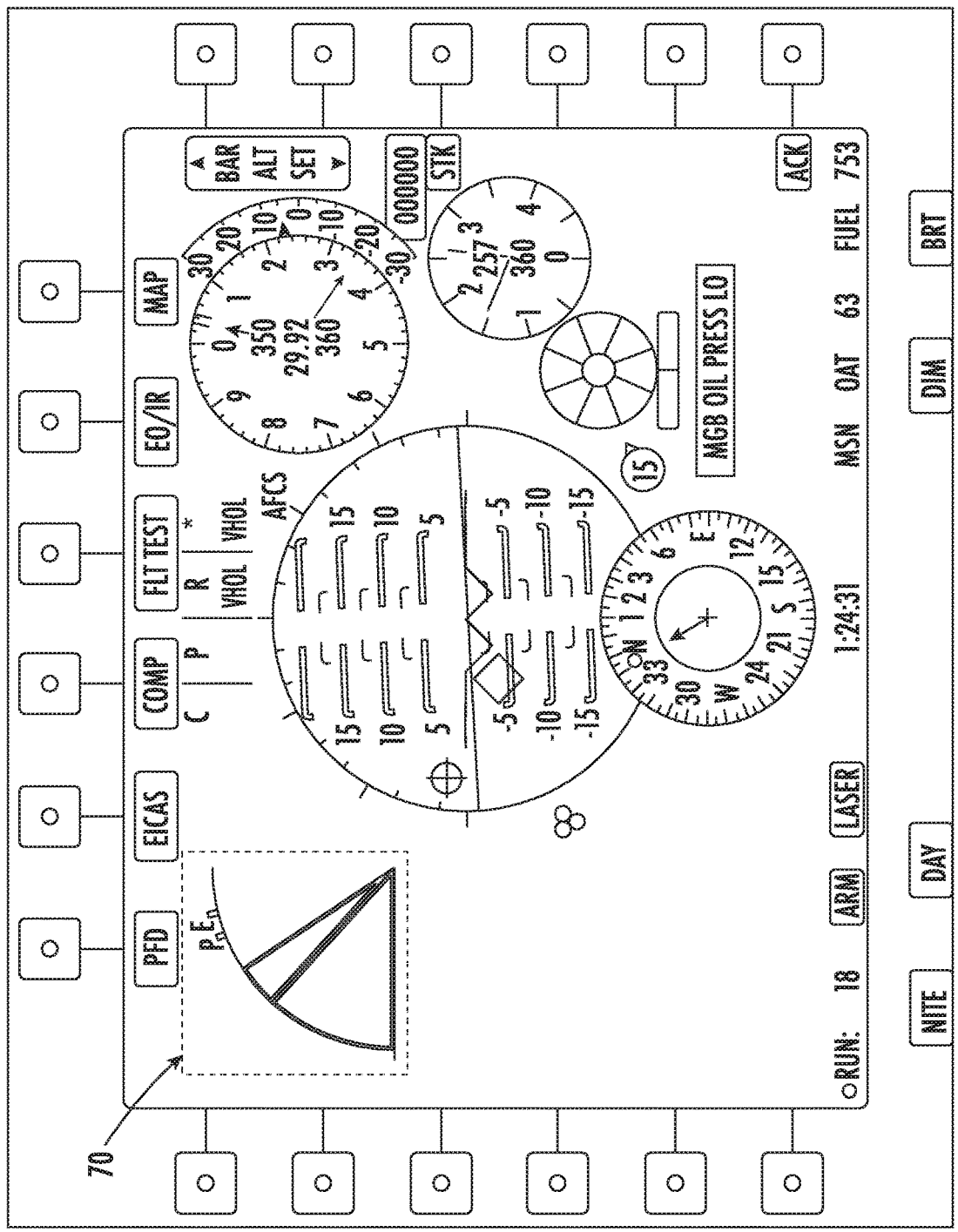
FIG. 4 is a front view of a multifunction display system of a rotary wing aircraft according to an embodiment.

With reference now to FIG. 4, an example of an I/O device 64 associated with the control system 50 is illustrated in more detail. In an embodiment, the device 64 is a display unit, such as disposed within the cockpit of the aircraft 10 for example. The display unit 64 may be located in front of one of the pilot and copilot, or alternatively, may be located at a position between the pilot and the copilot. In some embodiments, the display unit 64 is supported by an instrument console, while in other embodiments the display unit 64 may be a separate component independently mounted in the cockpit. In yet another embodiment, the display unit 64 may be visible in a windshield of the aircraft 10 or in a pilot helmet, such as via a heads up display for example. In the illustrated, non-limiting embodiment, the display unit 64 includes a multifunction display and includes a plurality of distinct display features, each of which is configured to provide an operator with one or more operating parameters of the aircraft.

Figure 5:
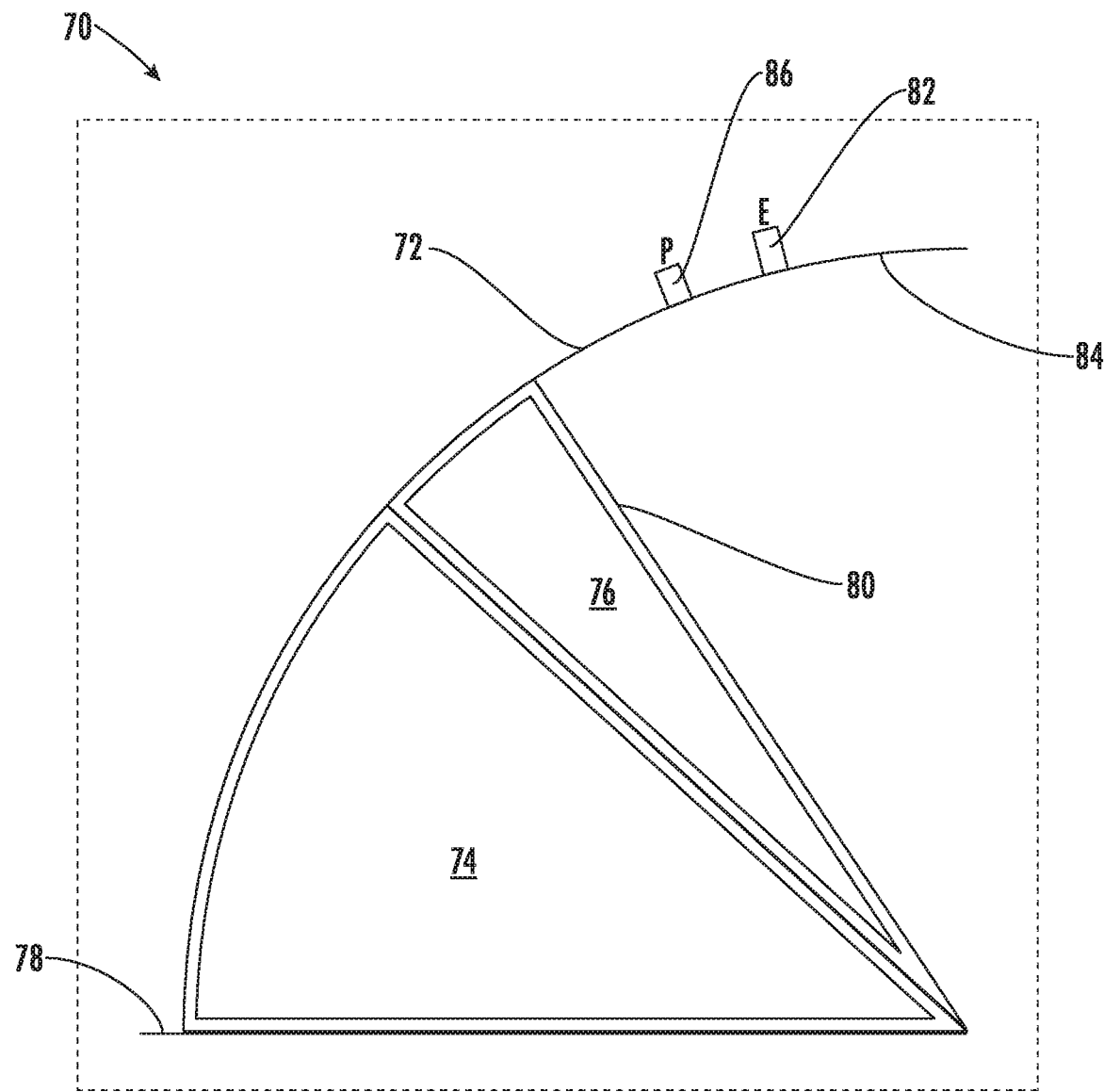
FIG. 5 is a front view of a power display of a rotary wing aircraft according to an embodiment.
Figure 6:
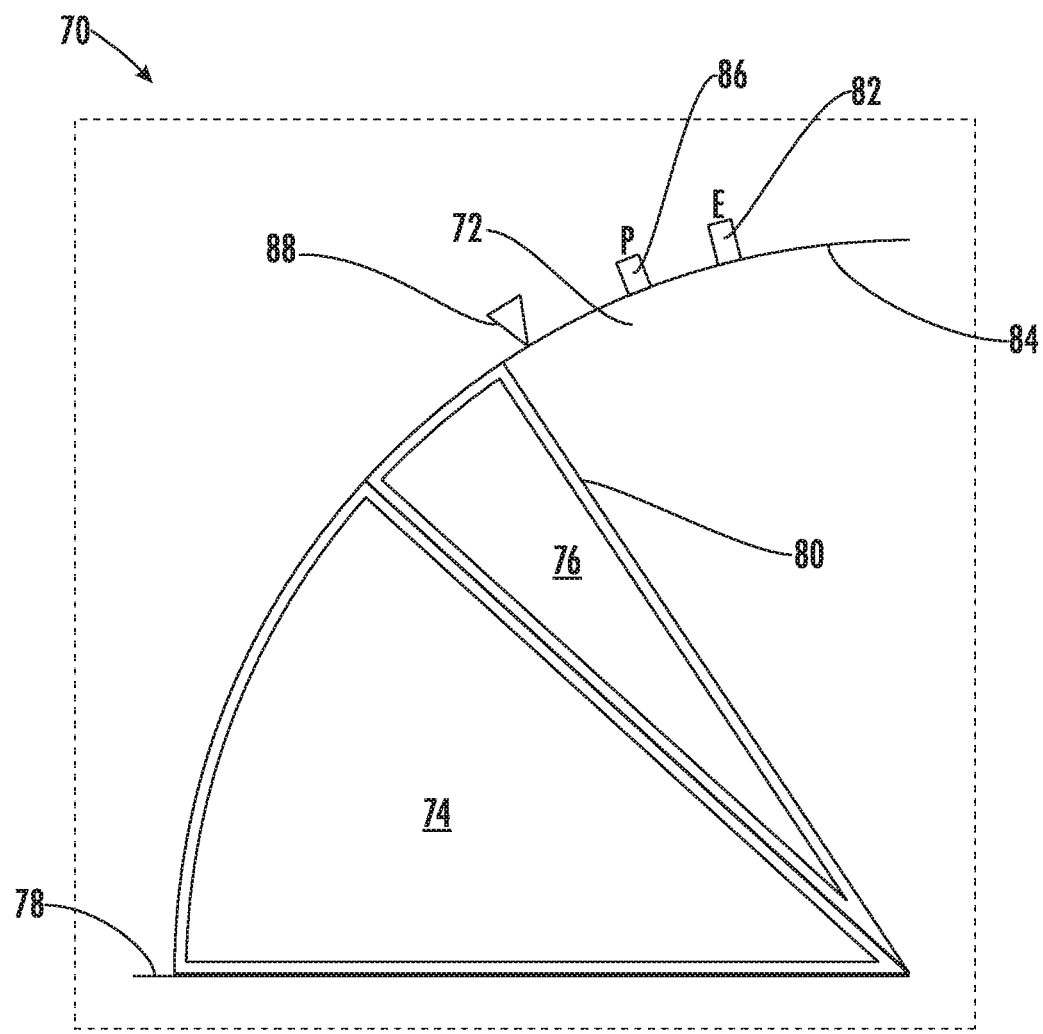
FIG. 6 is a front view of a power display of a rotary wing aircraft according to another embodiment.
Figure 7:
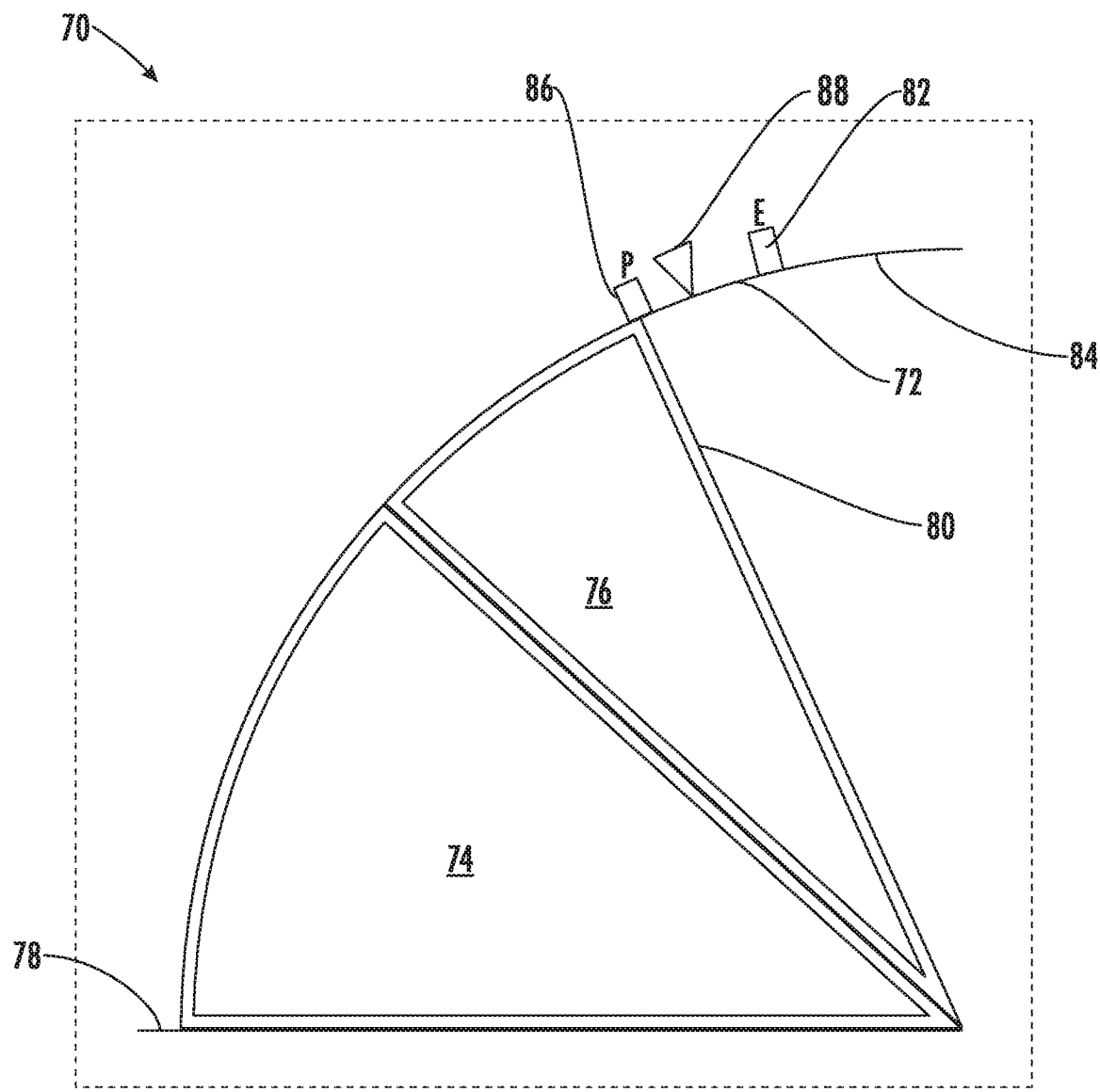
FIG. 7 is a front view of the power display of FIG. 6 according to another embodiment.

With reference now to FIGS. 5-7, one of the displays within the display unit 64 includes a power display 70 configured to visually indicate not only the total power being used by the main rotor system 12 and the translational thrust system 30, but also the relative percentages of power being used by each of the main rotor system 12 and the translational thrust system 30. The power display 70 includes a reference member 72, having any suitable shape, such as a line, dial, or arc for example. Although an arc extending approximately 90 degrees is shown, other embodiments including an arc that extends more than 90 degrees, such as up to 150 degrees for example, or less than 90 degrees, are also within the scope of the disclosure. Further, the reference member 72 may, but need not have reference markings arranged at intervals over the length of the reference member 72 to represent an incremental change in the power.

The power display 70 additionally includes a first indicator 74 configured to represent the power being used by the main rotor system 12 and a second indicator 76 configured to represent the power being used by the translational thrust system 30. In the illustrated, non-limiting embodiment, the first and second indicators 74, 76 are pie-shaped to conform with the arcuate reference member 72. However, it should be understood that embodiments where the first and second indicators 74, 76 have another configuration, for example where the first and second indicators 74, 76 are rectangular for example, are also within the scope of the disclosure. As shown, the first indicator 74 is located directly adjacent a first end 78 of the reference member 72, and a first side of the second indicator 76 directly abuts a second side of the first indicator 74. By stacking the first and second indicators 74, 76 relative to the reference member 72, the second side or the uppermost edge 80 of the second indicator 76 is configured to indicate the total power being used by both the main rotor system 12 and the translational thrust system 30 in combination. The power values indicated for the main rotor system 12 and the translational thrust system 30 may be determined in response to feedback provided by one or more sensors 52 to the control system 50.

In an embodiment, as shown in the FIGS., the first indicator 74 and the second indicator 76 are shaded using a first color and a second color, respectively. Although green and blue are used, it should be understood that any suitable colors are within the scope of the disclosure. This variation in color may be implemented to make the first and second indicators 74, 76, and therefore the power of the main rotor system 12 and the power of the translational thrust system 30, easily distinguishable for an operator viewing the display 70. In other embodiments, the first indicator 74 and the second indicator 76 may be shaded using the same color, or alternatively, may include no shading or coloring.

In another embodiment, regardless of whether the first and second indicator 74, 76 are the same color or different colors, the first indicator 74 and the second indicator 76 may be selectively shaded using one or a plurality of pattern fills to indicate that the main rotor system 12 and/or the translational thrust system 30, is approaching an operational limit. For example, the first indicator 74 may have a first patterned fill when the main rotor system 12 is approaching a power limit, such as a main gearbox torque limit, and the second indicator 76 may include a similar first patterned fill when the translational thrust system 30 is approaching a power limit such as a propeller gearbox torque limit. In an embodiment, approaching a corresponding torque limit may include instances where the torque of either the main rotor system 12 or the translational thrust system 30 is at least 75% of the total power or torque available, and in some embodiments at least 80%, at least 85% or at least 90%, of the main gearbox torque limit and the propeller gearbox torque limit, respectively. A second patterned fill, or alternatively, a solid fill, of the first indicator 74 or the second indicator 76 may be used to indicate that operation of the main rotor system 12 or the translational thrust system 30, respectively is approaching the limit of another operational parameter, such as the engine power limit for example.

In an embodiment, one or more limit markings may be formed along the reference member 72 to indicate one or more non-dimensional limits associated with operation of the aircraft 10. For example, the one or more limit markings may indicate a limit associated with one or more of the propeller gearbox, the main gearbox, and one or more engines of the aircraft. In the illustrated, non-limiting embodiment, the power display 70 includes an engine limit marking 82 configured to represent the most limiting operational parameter associated with one or more engines of the aircraft based on the current flight conditions of the aircraft 10. Examples of the limiting parameter of the one or more engines E of the aircraft 10 include, but are not limited to power, temperature, and gas intake. Accordingly, the parameter represented by the engine limit marking 82 will vary as the operation of the aircraft 10 varies, such as between high speed flight, low speed flight, and hover for example. In an embodiment, the position of the engine limit marking 82 is constant relative to the reference member 72. As shown, the reference member 72 is sized such that the engine limit marking 82 is arranged generally adjacent an upper end 84 of the reference member 72. However, embodiments where engine limit marking 82 is arranged at another location relative to the reference member 72, or embodiments where the position of the engine limit marking 82 varies relative to the reference member 72 are also contemplated herein.

Alternatively or in addition, the power display 70 may include another non-dimensional limit marking, such as a propeller torque limit marking 86 for example, configured to indicate the torque limit of the propeller gearbox. In an embodiment, the propeller torque limit marking 86 is configured to move dynamically relative to the reference member 72 in response to the operating conditions of the aircraft.

In an embodiment, best shown in FIGS. 6 and 7, the power display 70 additionally includes a symbol 88 arranged adjacent a first side of the reference member 72, opposite the first indicator 74 and the second indicator 76. As shown, the symbol 88 includes an inwardly facing triangular carat. However, any suitable symbol is within the scope of the disclosure. In the illustrated, non-limiting embodiment, the symbol 88 provides an indication of the power requested or commanded by the pilot or by the flight control system 50, such as the commanded propeller torque for example. Further, the position of the symbol 88 relative to the reference member 72 and the propeller torque limit marking 86 is configured to indicate whether the commanded torque is within the operational limits of the propeller gearbox. When the commanded torque is less than or equal to the propeller torque limit, the symbol 88 is arranged to the left of the propeller torque limit marking 86. Accordingly, when the symbol 88 representing the commanded torque is less than or equal to the propeller torque operational limit, the commanded torque may be achieved. When the propeller torque commanded by a pilot or the flight control system 50 of the aircraft 10 exceeds the propeller torque limit, the symbol is located to the right of the propeller torque limit marking 86. When the symbol 88 is located to the right of the propeller torque limit marking 86, the commanded propeller torque cannot be achieved.

In an embodiment, the symbol 88 has a first configuration when the commanded power or propeller torque is less than or equal to the propeller torque. For example, as shown in FIG. 6, the symbol 88 may be represented by an outline and is not filled in. Similarly, the symbol may have a second configuration, distinct form the first configuration, when the propeller torque commanded by a pilot or the flight control system 50 of the aircraft 10 exceeds the propeller torque limit. In the non-limiting embodiment illustrated in FIG. 7, when the command torque is greater than the propeller torque limit, the symbol 88 is filled in. By changing the configuration of the symbol between instances when then commanded torque is achievable and when the commanded torque is not achievable, an operator of the aircraft 10 will be able to easily identify that the commanded power is not available.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power display of an aircraft having a main rotor system and a translational thrust system comprising:
    a reference member;
    a first indicator arranged adjacent the reference member and operable to display a power being used by the main rotor system; and
    a second indicator arranged adjacent the reference member and operable to display a power being used by the translational thrust system,
    wherein the first indicator and the second indicator are stacked relative to the reference member such that the first indicator and the second indicator together represent a total power being used by the main rotor system and the translational thrust system in combination.

2. The power display of claim 1, wherein the first indicator is a first color and the second indicator is a second color different from the first color.

3. The power display of claim 1, wherein at least one of the first indicator includes a patterned fill when the main rotor system is approaching an operational limit and the second indicator includes a patterned fill when the translational thrust system is approaching an operational limit.

4. The power display of claim 3, wherein the first indicator includes the patterned fill when the main rotor system is approaching a main gearbox torque limit.

5. The power display of claim 3, wherein the second indicator includes the patterned fill when the translational thrust system is approaching a propeller gearbox torque limit.

6. The power display of claim 1, further comprising at least one limit marking formed along the reference member, wherein the at least one limit marking identifies one or more non-dimensional limits associated with operation of the aircraft.

7. The power display of claim 6, wherein the aircraft includes at least one engine and the at least one limit marking includes an engine limit marking, the engine limit marking representing a most limiting operational parameter associated with the at least one engine based on flight conditions of the aircraft.

8. The power display of claim 7, wherein the engine limit marking is fixed relative to the reference member.

9. The power display of claim 6, wherein the aircraft includes a propeller gearbox, and the at least one limit marking includes a propeller torque limit marking, the propeller torque limit marking representing a torque limit of the propeller gearbox.

10. The power display of claim 9, wherein the propeller torque limit marking is movable relative to the reference member.

11. The power display of claim 1, further comprising a symbol indicating a commanded power.

12. The power display of claim 11, wherein the symbol has a first configuration when the commanded power is achievable via control of at least one of the main rotor system and the translational thrust system, and the symbol has a second configuration when the commanded power exceeds an operational limit of the aircraft.

13. The power display of claim 1, wherein the second indicator includes a first edge and a second edge, the first edge directly abutting the first indicator and the second edge indicating the total power.

14. A method of using a power display of an aircraft comprising:

displaying power being used by a main rotor system of the aircraft via a first indicator arranged adjacent a reference member;

displaying power being used by a translational thrust system of the aircraft via a second indicator arranged adjacent the reference member wherein the second indicator is stacked adjacent the first indicator relative to the reference member; and indicating a total power being used by the main rotor system and the translational thrust system in combination relative to the reference member via the first indicator and the second indicator.

15. The method of claim 14, further comprising indicating a nondimensional engine limit.

16. The method of claim 14, further comprising indicating a nondimensional propeller gearbox torque limit.

17. The method of claim 14, further comprising indicating a commanded power.

18. The method of claim 17, further comprising indicating when the commanded power exceeds an operational limit of the aircraft.

19. The method of claim 17, further comprising indicating when the commanded power is less than or equal to an operational limit of the aircraft.

20. The method of claim 17, wherein the second indicator includes a first edge that directly abuts the first indicator and a second edge indicating the total power.

* * * * *